United States Patent [19]
White

[11] Patent Number: 4,779,184
[45] Date of Patent: Oct. 18, 1988

[54] SWITCH MODE POWER SUPPLY WITH REDUCED NOISE

[75] Inventor: Robert C. White, La Mesa, Calif.

[73] Assignee: Sundstrand Corp., Rockford, Ill.

[21] Appl. No.: 108,283

[22] Filed: Oct. 14, 1987

[51] Int. Cl.⁴ .................................... H02M 3/335
[52] U.S. Cl. ...................... 363/65; 363/21; 363/97
[58] Field of Search .............. 363/16, 20–21, 363/24–26, 41, 65, 71, 97–98, 131–134

[56] References Cited

U.S. PATENT DOCUMENTS

| | | | |
|---|---|---|---|
| 3,621,365 | 11/1971 | Beck et al. | 321/27 R |
| 3,675,037 | 7/1972 | Hamilton | 307/51 |
| 3,974,437 | 8/1976 | Patel et al. | 321/27 R |
| 3,984,799 | 10/1976 | Fletcher et al. | 363/97 X |
| 4,195,333 | 3/1980 | Hedel | 363/65 X |
| 4,257,090 | 3/1981 | Kröger et al. | 363/65 |
| 4,290,101 | 9/1981 | Hergenhan | 363/65 |
| 4,386,311 | 5/1983 | Bafaro | 323/271 |
| 4,424,557 | 1/1984 | Steigerwald | 363/98 |
| 4,471,422 | 9/1984 | Hierholzer, Jr. | 363/56 |
| 4,489,371 | 12/1984 | Kernick | 363/41 X |
| 4,533,836 | 8/1985 | Carpenter et al. | 307/11 |
| 4,535,399 | 8/1985 | Szepesi | 363/16 X |
| 4,618,919 | 10/1986 | Martin, Jr. | 363/21 |
| 4,621,311 | 11/1986 | O'Brien | 363/21 |
| 4,635,179 | 1/1987 | Carsten | 363/70 |

Primary Examiner—Peter S. Wong
Attorney, Agent, or Firm—Antonelli, Terry & Wands

[57] ABSTRACT

A switch mode power supply is disclosed having a pair of switch mode power supply sections which are maintained precisely 180° out of phase and precisely matched in duty cycle. The phase locking of the switch mode power supply sections produces an output voltage which is substantially free of harmonics which requires greatly reduced filtering. A phase lock loop is provided for controlling the phase and duty cycle between the first and second sections of the switch mode power supply.

10 Claims, 2 Drawing Sheets

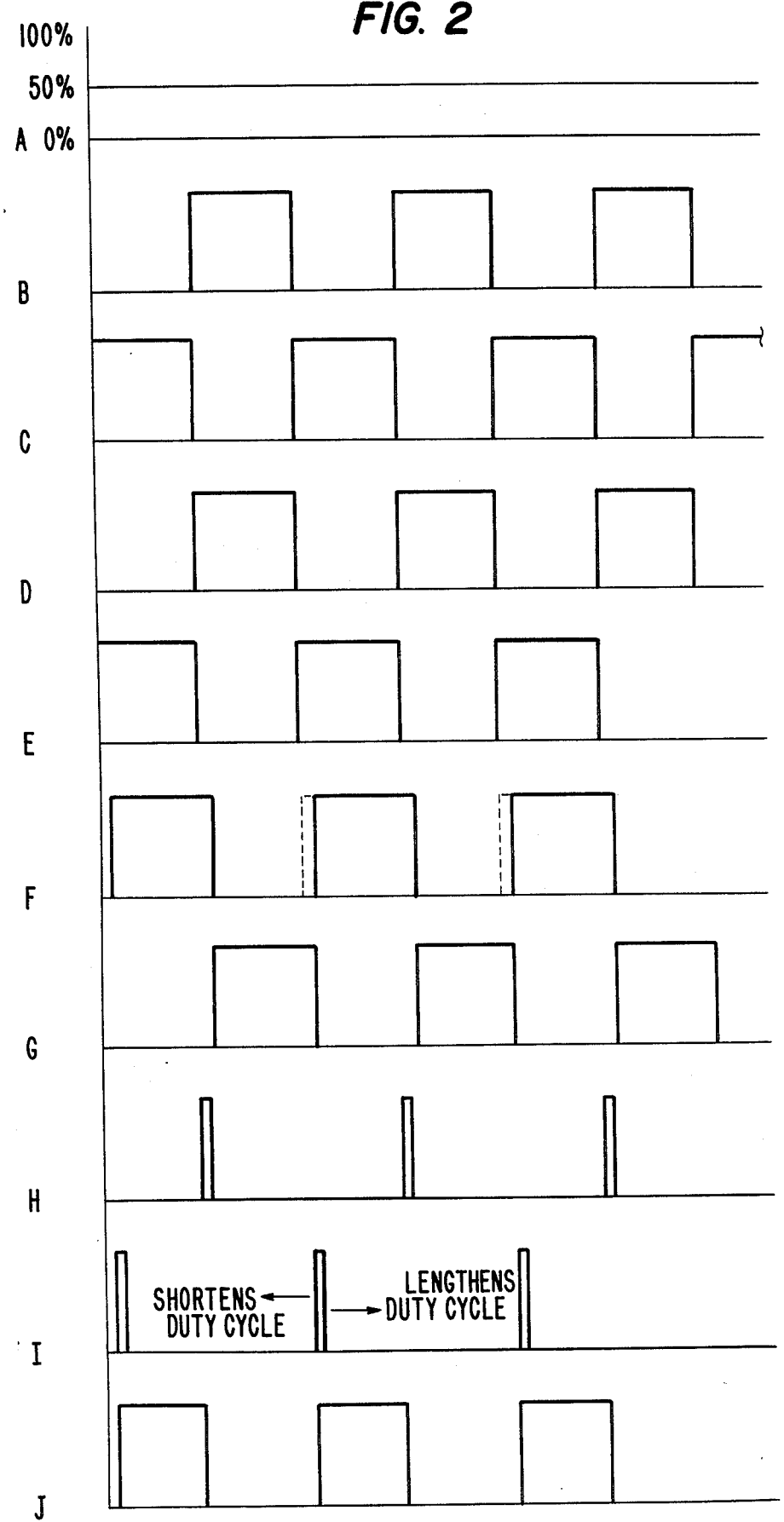

SWITCH MODE POWER SUPPLY WITH REDUCED NOISE

BACKGROUND OF THE INVENTION

1. Field of the Invention

The present invention relates to switch mode power supplies for converting DC input power to a regulated DC output potential. More particularly, the present invention relates to switch mode power supplies of the aforementioned type which have low noise.

2. Description of the Prior Art

Switch mode power supplies are known having two separate switch mode power supplies each containing a switch operated 180° out of phase with respect to the other. See U.S. Pat. Nos. 4,386,311, 4,533,836 and 4,618,919. None of the aforementioned switch mode power supplies provides a phase lock loop in which the on and off times of the switches are phase locked together to insure the best possible matching of the duty cycle and a 180° out of phase relationship of the switching of each of the switching elements.

SUMMARY OF THE INVENTION

The present invention is an improved switch mode power supply having a pair of switch mode power supplies having matched duty cycles with a precisely 180° out of phase relationship. Preferably, the outputs of each of the switch mode power supplies are combined to produce a highly regulated output potential having extremely low noise. Each of the switch mode power supplies contains a pulse width modulator having an on and off cycle with the respective on and off cycles locked 180° out of phase by a phase lock loop to produce the aforementioned low noise output signal. Furthermore, a switch mode power supply in accordance with the present invention is relatively simple in construction and may be implemented in power supplies having both small and large power ratings.

A switch mode power supply for converting DC input power to a regulated DC output in accordance with the invention includes first and second series circuits coupled between a pair of reference potentials with the first series circuit having a first switch coupled to an inductance with the first switch having a control terminal to which a first control signal is applied for controlling the flow of current in the inductance of the first series circuit as a function of the first control signal and a second series circuit coupled between the pair of reference potentials with the second series circuit having a second switch coupled to an inductance with the second switch having a control terminal to which a second control signal is applied for controlling the flow of current in the inductance within the second series circuit, a source for producing first and second pulse trains of pulses each occurring at a reference frequency with the first pulse train being phased displaced precisely 180° with respect to the second pulse train; a source for producing third and fourth pulse trains of pulses each occurring at a reference frequency with the third pulse train being phased displaced 180° with respect to the fourth pulse train; a controller for controlling the phase of the first and second pulse trains with respect to the third and fourth pulse trains as a function of one or more sensed voltages in the power supply with a relative phase being maintained between one of the first and second pulse trains and one of the third and fourth pulse trains; a first control signal generator responsive to one of the first and second pulse trains and one of the third and fourth pulse trains for generating the first control signal; and a second control signal generator, responsive to the other of the first and second pulse trains and the other of the third and fourth pulse trains for generating the second control signal, the first and second control signals being phase displaced 180° from each other and having equal duty cycles.

The controller for controlling the phase of the first and second pulse trains with respect to the third and fourth pulse trains is a phase lock loop including a phase detector having a pair of inputs, with one of the inputs being from one of the first and second pulse trains and the other of the inputs being from one of the third and fourth pulse trains, and the phase detector output outputting a phase difference signal which is a function of the phase of the input signals; a voltage monitoring circuit for developing a voltage error signal which is a function of one or more voltages sensed in the power supply; a circuit for summing the phase difference signal and the voltage error signal; a voltage controlled oscillator outputting a signal which is a function of the reference frequency signal with the output frequency varying in phase in response to the sum of the phase difference signal and the voltage error signal, and a dividing circuit, coupled to the voltage controlled oscillator for dividing the output signal from the voltage controlled oscillator by two to produce the third and fourth pulse trains.

The first and second pulse trains are produced by a constant frequency oscillator outputting a signal which is a function of the reference frequency, and a dividing circuit, coupled to the output of the constant frequency oscillator for dividing the output signal from the constant frequency oscillator by two to produce the first and second pulse trains.

The first control signal is produced by a first flip-flop outputting a series of pulse width modulated pulses which are defined by the time interval between an edge of one of the first and second pulse trains and an edge of one of the third and fourth pulse trains and the second control signal is produced by a second flip-flop outputting a series of pulses which are defined by the time interval between an edge of the other of the first and second pulse trains and the other of the third and fourth pulse trains. The pulses from each flip-flop are defined by the interval between the receipt of a set pulse and a reset pulse. In the preferred form of the invention, the first and second pulse trains are respectively the on triggers for the first and second flip-flops and third and fourth pulse trains are the off triggers.

BRIEF DESCRIPTION OF THE DRAWINGS

FIG. 2 is a timing diagram explaining the operation of the block diagram of FIG. 1.

DESCRIPTION OF THE PREFERRED EMBODIMENT

Figure 1:
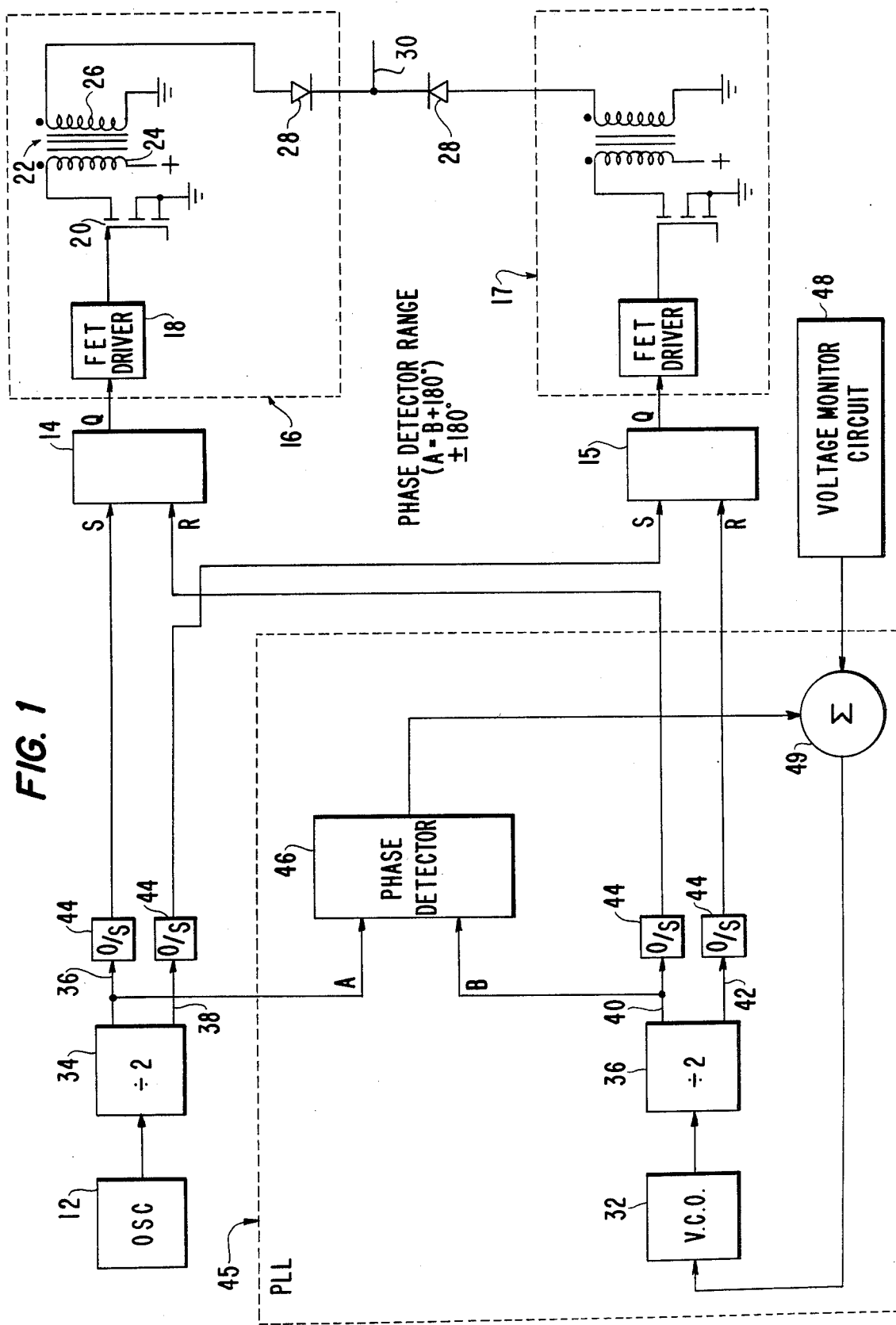
FIG. 1 is a block diagram of an embodiment of the present invention.

FIG. 1 illustrates a block diagram of an embodiment of the present invention. The present invention utilizes phase control to achieve a switched mode power supply with switch mode power supply sections 16 and 17 having equal duty cycles 180° out of phase with respect to each other. Maintaining the switch mode power supply sections 16 and 17 precisely 180° out of phase minimizes noise. When the input voltage is at one-half the rated maximum input voltage, the duty cycle of each of the sections of the switch mode power supply is 50% so that the combined on time for each of the switched elements is 100% of the possible on time for a single one of the switch elements. As the input voltage increases, the duty cycle of each of the switches proportionally decreases. FIG. 2(A) illustrates the input voltage at 50% of the maximum input voltage at which the power supply is designed to operate. At this voltage, the duty cycle of the individual switch mode power supply sections 16 and 17 is at precisely 50% with the reference switching frequency being one-half the frequency outputted by the oscillator 12 and voltage controlled oscillator 32 and each of the output pulses being precisely 180° out of phase with each other and having an equal duty cycle as illustrated respectively in FIGS. 2(B) and 2(C).

Oscillator 12 outputs a signal which is the time base for producing the set signals for a first flip-flop 14 and a second flip-flop 15 of identical construction which control the on and off cycle of the identical switch mode power supply sections 16 and 17. The duty cycle of the individual flip-flops 14 and 15 is variable. If the input voltage as monitored by the voltage monitor circuit 48 varies from the 50% figure as illustrated in FIG. 2(A), the duty cycle of the individual flip-flops 14 and 15 will be varied from 50% but the output pulses Q will be precisely 180° out of phase with respect to each other. A voltage control oscillator 32, which has a center frequency the same as the frequency of oscillator 12 and a narrow frequency band, is used for generating the reset pulses for each of the flip-flops 14 as described below in detail.

Each switch mode power supply section 16 and 17 is comprised of a field effect transistor driver circuit 18 which converts the high level output signal from the flip-flops 14 and 15 into a level sufficient for driving switch 20 which may be a field effect transistor or other switch. A series circuit comprised of the aforementioned switch 20 and an inductance, which in this embodiment is the primary coil 24 of inductor 22, is coupled between a pair of reference potentials which are ground and the input voltage of the power supply. Output potential from each of the sections 16 is taken from the secondary 26 of the inductor 24 through diode 28. The outputs from each of the sections 16 and 17 are combined into an output 30 which outputs the output potential from the power supply. The present invention is not limited to the above-described implementation of the switch mode power supply sections 16 and 17 and other known configurations of switched mode power supplies may be used with equal facility.

The output frequency of oscillator 12 is divided by two into a square wave of a reference frequency by a divide by two circuit 34 to form a first pulse train on output 36 illustrated in FIG. 2(D) and a second pulse train on output 38 illustrated in FIG. 2(E) which are phase displaced 180° from each other. Similarly, the output frequency of voltage control oscillator 32 is divided by two into a square wave of the reference frequency by a divide by two circuit 35 to form a third pulse train on output 40 illustrated in FIG. 2(F) and a fourth pulse train on output 42 illustrated in FIG. 2(G) which are phase displaced 180° from each other. The divide by two circuits 34 and 35 are of conventional construction and are identical. A one shot multivibrator 44, of conventional construction, is coupled to each of the outputs 36–40 of the divide by two circuits 34 and 35 to produce a short pulse keyed to the leading edge of the square wave input pulse. FIG. 2(H) illustrates the output from the one shot multivibrator connected to the output 36. FIG. 2(I) illustrates the output from the one shot multivibrator 44 connected to the output 38. Thus, it is seen that the one shots 44 coupled to the outputs 36 and 38 produce short duration output pulses keyed to the leading edge of the first and second pulse trains. Similarly, although not illustrated, the one shots 44 coupled to the outputs 40 and 42 produce short duration pulses keyed to the leading edge of the third and fourth pulse trains.

An important part of the present invention is the maintenance of the precise 180° out of phase difference between the first and second pulse trains, the precise 180° out of phase difference between the third and fourth pulse trains and the equal duty cycles of the switch mode power supplies 16 and 17. A phase lock loop 45 maintains the equal duty cycles of the switch mode power supplies by locking a fixed phase relationship between the first and second pulse trains and the third and fourth pulse trains. The phase lock loop 45 includes the phase detector 46, voltage monitor circuit 48, summer 49, voltage controlled oscillator 32 and divided by two circuit 36. The phase detector 46, which may be of the type having a range wherein A=B+180° +/−180°, compares the relative phases between the outputs 36 and 40. Alternatively, the outputs 38 and 42 could be used as the waveforms which are compared. FIG. 2(F) illustrates a rectangular section having two sides defined by dotted lines which is indicative of the phase displacement (error) between the outputs of the first and third pulse trains. The purpose of the phase lock loop 45 is to eliminate the aforementioned displacement to produce pulse width modulation of the output pulses from the switch mode power supply sections 16 and 17 of same duration and 180° out of phase. The oscillator 12 and the voltage controlled oscillator 32 oscillate at the same frequency which is twice the reference frequency of the first, second, third and fourth pulse trains. Extremely small changes in frequency are made in the voltage controlled oscillator 32 to control the relative phase between the respective pulse trains 36 and 40 and 38 and 42. The maintenance of the switch mode power supplies 16 and 17 being precisely 180° out of phase greatly reduces the requirement for filtering in most applications. The output signal from the output 30 is essentially free of harmonics as a result of the precise phase locking. Moreover, the invention has a combined inductance volume comparable to switch mode power supplies using a single inductor.

While the invention has been described in terms of a preferred embodiment, numerous modifications may be made thereto without departing from the spirit and scope of the invention. It is intended that all such modifications fall within the scope of the appended claims.

I claim:

1. A switch mode power supply for converting DC input power to a DC regulated output comprising:
   (a) means for producing first and second pulse trains of pulses each occurring at a reference frequency with the first pulse train being phase displaced 180° with respect to the second pulse train;
   (b) means for producing third and fourth pulse trains of pulses occurring at the reference frequency with the third pulse train being phase displaced 180° with respect to the fourth pulse train, the phase of the pulses of the third and fourth pulse trains being variable with respect to the phase of the pulses of the first and second pulse trains;

(c) voltage monitoring means for developing a voltage error signal which is a function of one or more voltages sensed in the power supply;

(d) a phase detector for generating a phase difference signal by comparing the phase of the pulses in one of the first and second pulse trains with the phase of the pulses of one of the third and fourth pulse trains;

(e) means, coupled to the phase difference signal and the voltage error signal, for controlling the means for producing the third and fourth pulse trains to vary the phase of the pulses therein with respect to the phase of the pulses of the first and second pulse trains as a function of the voltage error signal and the phase error signal;

(f) a first series circuit, coupled between a pair of reference potentials, comprising a first switching means, coupled to one of the reference potentials, in series with an inductance coupled to the other of the reference potentials, the first switching means having a control terminal to which a first control signal is applied for controlling the flow of current in the inductance of the first series circuit as a function of the first control signal;

(g) a second series circuit, coupled between the pair of reference potentials, comprising a second switching means, coupled to one of the reference potentials, in series with an inductance, coupled to the other of the reference potentials, the second switching means having a control terminal to which a second control signal is applied for controlling the flow of current in the inductance of the second series circuit as a function of the second control signal;

(h) means, responsive to one of the first and second pulse trains and one of the third and fourth pulse trains, for generating the first control signal;

(i) means, responsive to another of the first and second pulse trains and another of the third and fourth pulse trains for generating the second control signal, the first and second control signals being phase displaced 180° from each other and having equal duty cycles; and (j) an output means for producing the DC regulated output as a function of the current flowing in the first and second series circuits.

2. A switch mode power supply in accordance with claim 1 wherein:

(a) the means for generating the first control signal is a first flip-flop and the first control signal is a series of pulses which each pulse having a width proportional to an interval defined between an edge of the pulses in one of the first and second pulse trains and an edge of one of the third and fourth pulse trains; and (b) the means for generating the second control signal is a second flip-flop and the second control signal is a series of pulses with each pulse having a width proportional to an interval defined between an edge of the pulses in the other of the first and second pulse trains and an edge of the other of the third and fourth pulse trains.

3. A switch mode power supply in accordance with claim 1 wherein a beginning of the interval of the first and second flip-flops is determined by setting of the flip-flop and an end of the interval of the first and second flip-flop is determined by resetting of the flip-flop.

4. A switch mode power supply in accordance with claim 1 further comprising:

(a) means for summing the phase difference signal and the voltage error signal; a voltage controlled oscillator, coupled to the means for summing, for outputting an output signal with the output frequency varying in response to the sum of the phase difference signal and the voltage error signal, dividing means, coupled to the voltage controlled oscillator for dividing the output signal from the voltage controlled oscillator by two to produce the third and fourth pulse trains; and wherein (b) the means for producing the first and second pulse trains comprises a fixed frequency oscillator outputting an output signal, dividing means, coupled to output of the fixed frequency oscillator, for dividing the output signal from the fixed frequency oscillator by two to provide the first and second pulse trains.

5. A switch mode power supply for converting a DC input potential to a DC output potential comprising:

(a) first and second series circuits coupled between a pair of reference potentials with the first series circuit having a first switching means, coupled to an inductance, the first switching means having a control terminal to which a first control signal is applied for controlling the flow of current in the inductance of the first series circuit as a function of the first control signal and a second series circuit coupled between the pair of reference potentials with the second series circuit having a second switching means coupled to an inductance, the second switching means having a control terminal to which a second control signal is applied for controlling the flow of current in the inductance within the second series circuit;

(b) means for producing first and second pulse trains of pulses each occurring at a reference frequency with the first pulse train being phase displaced 180° with respect to the second pulse train;

(c) means for producing third and fourth pulse trains of pulses each occurring at the reference frequency with the third pulse train being phase displaced 180° with respect to the fourth pulse train;

(d) means for controlling the phase of the first and second pulse trains with respect to the third and fourth pulse trains as a function of one or more sensed voltages in the power supply and a relative phase between one of the first and second pulse trains and one of the third and fourth pulse trains;

(e) means, responsive to one of the first and second pulse trains and one of the third and fourth pulse trains, for generating the first control signal; and (f) means, responsive to the other of the first and second pulse trains and the other of the third and fourth pulse trains for generating the second control signal, the first and second control signals being phase displaced 180° from each other and having equal duty cycles.

6. A switch mode power supply in accordance with claim 5 wherein the means for controlling phase of the first and second pulse trains with respect to the third and fourth pulse trains comprises:

(a) a phase detector having a pair of inputs, with one of the inputs being either the first or second pulse trains and the other of the inputs being either the third or fourth pulse trains, and an output outputting a phase difference signal which is a function of the phase of the input signals;
(b) voltage monitoring means for developing a voltage error signal which is a function of one or more voltages sensed in the power supply;
(c) means for summing the phase difference signal and the voltage error signal;
(d) a voltage controlled oscillator outputting an output signal with the frequency of the output signal varying in response to the sum of the phase difference signal and the voltage error signal; and
(e) dividing means, coupled to the output of the voltage controlled oscillator, for dividing the output signal from the voltage controlled oscillator by two to produce the third and fourth pulse trains.

7. A switch mode power supply in accordance with claim 6 wherein the means for producing the first and second pulse trains comprises:
(a) a fixed frequency oscillator outputting an output signal which is a function of the reference frequency; and
(b) dividing means, coupled to output of the fixed frequency oscillator, for dividing the output signal from the fixed frequency oscillator by two to provide the first and second pulse trains.

8. A switch mode power supply in accordance with claim 6 wherein the means for generating each of the first and second control signals is respectively a flip-flop with set and reset input terminals and an output terminal with a beginning of the interval of each flip-flop being determined by setting of the flip-flop and an end of the interval of each flip-flop being determined by resetting of the flip-flop.

9. A switch mode power supply for converting a DC input power to a DC regulated output comprising:
(a) means for producing a fixed reference frequency signal;
(b) means for producing a variable frequency signal having a phase relationship which is varied with respect to a phase relationship of the fixed reference frequency;
(c) a first switch mode power supply producing pulses in response to a first control signal;
(d) a second switch mode power supply producing pulses in response to a second control signal; and
(e) control means, responsive to the fixed reference signal and the variable frequency signal for producing the first and second control signals, the first and second control signals having equal duty cycles and being 180° out of phase with respect to each other.

10. A switch mode power supply in accordance with claim 9 wherein the outputs of the first and second switch mode power supplies are combined.

* * * * *